(No Model.) 2 Sheets—Sheet 1.
J. F. CUNNINGHAM, Sr.
COTTON HARVESTER.
No. 406,266. Patented July 2, 1889.
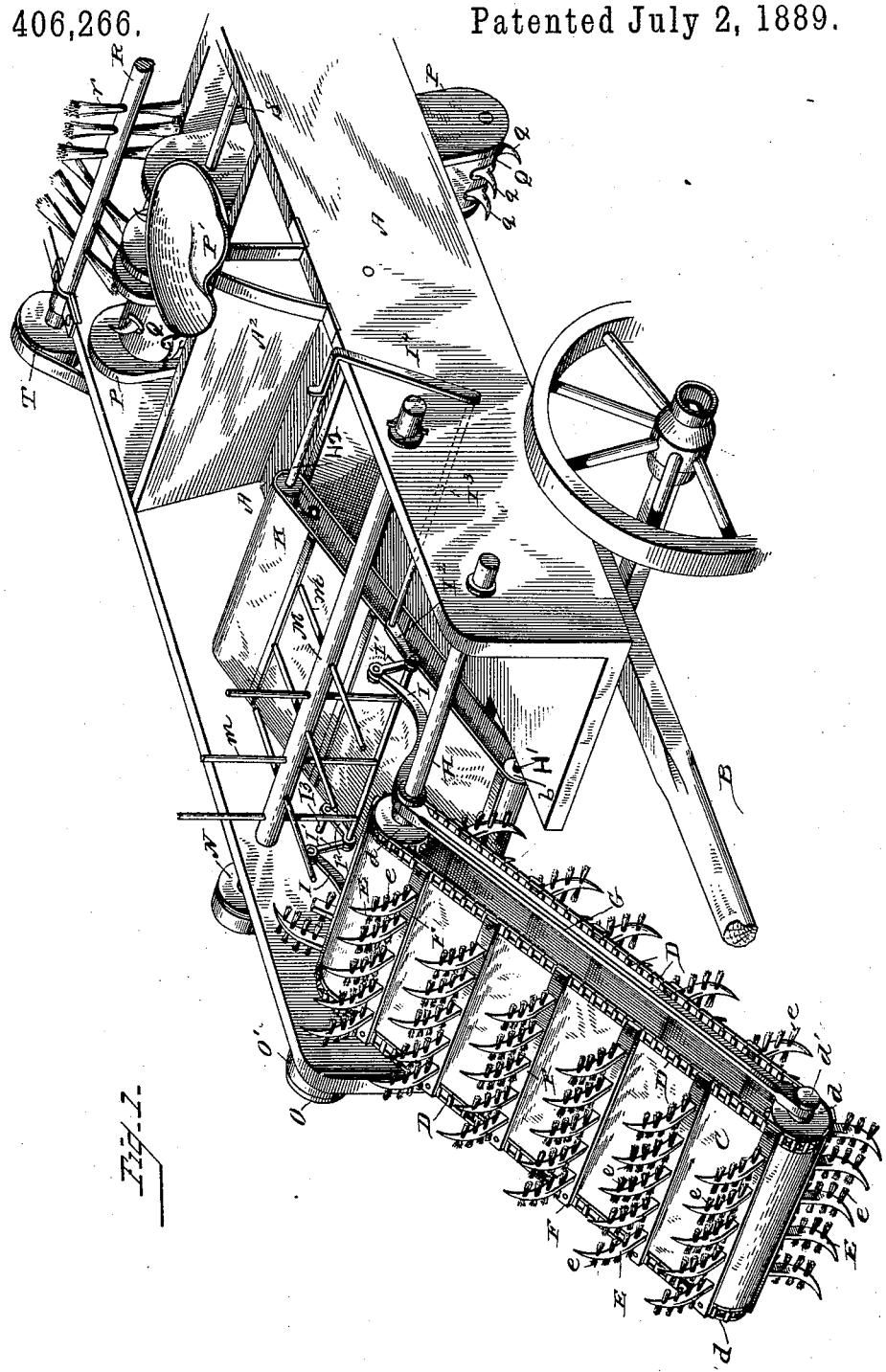

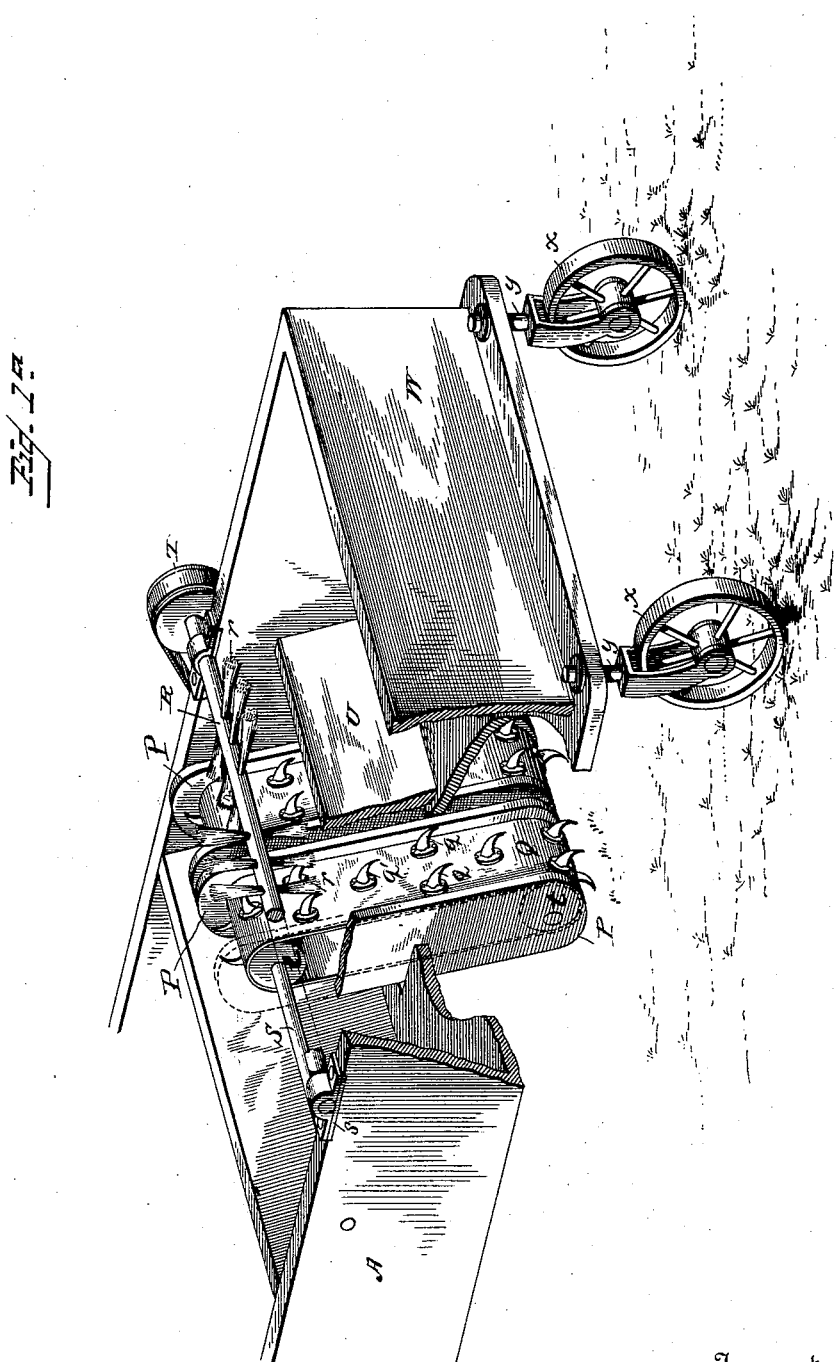

UNITED STATES PATENT OFFICE.

JAMES FRANKLIN CUNNINGHAM, SR., OF ANSON, TEXAS.

COTTON-HARVESTER.

SPECIFICATION forming part of Letters Patent No. 406,266, dated July 2, 1889.

Application filed October 30, 1886. Serial No. 217,589. (No model.)

*To all whom it may concern:*

Be it known that I, JAMES FRANKLIN CUNNINGHAM, Sr., formerly of Fulton county, Arkansas, a citizen of the United States, residing at Anson, in the county of Jones and State of Texas, have invented certain new and useful Improvements in Cotton-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cotton-harvesting machines; and it consists in certain details of construction and arrangement of the several parts, as will be hereinafter fully described in the specification and pointed out in the claims.

In the accompanying drawings, Figure 1 is a perspective view of the harvester; Fig. 1ª, a perspective view of the rear end of the harvester.

The device here presented is an improvement on the patent granted to me May 31, 1881, No. 242,189.

The object of the invention is to strip off the cotton when it is ripe and open (or sufficiently matured to open) and leave the stalk standing; also to gather such cotton as may have fallen out upon the ground before the operation of picking commences. As is well known, the cotton-stalks are of various sizes and shapes, and as the cotton grows irregularly on the stalks it is difficult to gather all the cotton and leave the stalks standing. Again, as the cotton-bolls open at different times in some seasons and in some localities, a considerable part of the cotton falls out before picking-time and is wasted.

In the majority of cotton-picking machines, if all the cotton is picked, the large spreading stalks are pulled up and the machine becomes choked. To remedy this and other sources of annoyance is the special object of my present invention.

In the drawings, A represents the body of the machine, which is somewhat similar to a wagon-body and supports and contains the picking mechanism, and is mounted upon and rests mainly on the two front wheels, one or both of which may be driving-wheels, and are far enough apart to straddle or inclose two ordinary rows, the rear end of the body being balanced and supported upon caster-wheels $x$, swiveled at $y$, to enable the machine to be readily turned.

The main picking device is located at the front end of the body A, and its mechanism is actuated by the main driving-wheels. At one side of the body is secured the pole B, to which the team is attached alongside of the picker and away from the unpicked cotton-rows. The main picking device consists in a frame, preferably of iron, pivoted at its rear end to a horizontal shaft H, extending through the front of the body A, and is composed of the side bars G and lower horizontal shaft $d'$. The shaft H is journaled in the sides of the body A and the shaft $d'$ in the front ends of the frame-bars G. Upon the shafts H and $d'$ are rigidly fixed sprocket-wheels $d$, over which pass endless sprocket-chains D. Between the sprocket-wheels are drums, over which passes an endless apron or belt C. Extending across the apron or belt C, at suitable distances apart, are a series of horizontal bars F, secured at their ends to the sprocket-chains D. These bars form supports for the gathering-fingers E. To each bar is secured a series of projecting curved fingers E, situated at suitable distances apart and extending entirely across the frame between the chains D. These fingers are placed far enough apart to enable the large stalks and spreading branches to pass freely between them without pulling the branches off or the stalk from the ground, and thus choking the machine; and in order to entirely strip the cotton from the branches as they pass between the fingers I place rows of brushes $e$, made of bristles or other suitable flexible material, on the side of each finger, standing out toward each other, so that they meet or nearly meet in the center, thereby closing or nearly closing the spaces between the fingers. As the branches pass between the fingers, the brushes catch and hold the cotton, which is carried by the apron C over the drum at the upper end of the frame.

The frame side bars G are provided with rearward extensions I beyond the shaft H, which extensions connect, by means of cranks I² and links I′, with a foot-lever I⁴, rigidly secured to the shaft I³, mounted in bearings in the sides of the body A. By means of this lever I⁴, which is within easy reach of the driver or operator, he is enabled to easily raise or lower the forward end of the picker-frame in order to adjust it to inequalities of the ground, to avoid obstructions, or to reach any desired height on the cotton-stalk without in any manner interfering with or impeding the actuating mechanism.

Immediately in rear of shaft H is located shaft M, which has inserted through it at right angles arms $m$, and serves to form a reel, the arms of which during its revolution pass between the fingers E and the ends of the outstanding brushes or bristles $e$ between the fingers as each series of fingers passes over the rear drum.

Immediately beneath shaft H, and at a suitable distance below, to enable the fingers E to clear it in their passage around the frame, is journaled a similar shaft H′, and immediately over the front wall of the cotton-receptacle A² is journaled a similar shaft H². Upon each of these shafts is a pulley or drum $b$, of suitable length to carry an endless apron or belt K, equal in width to the apron C on the picker-frame.

O represents a pulley on the end of shaft H, which actuates said shaft and the sprocket-wheels $d$ thereon, carrying, respectively, the picker-frame bars and the endless chains. N is a corresponding pulley on shaft M. The pulley O is actuated by means of a band O′ from the drive-wheel, and similar bands and pulleys are used to actuate shafts M and H²; or gearing connecting them with the drive-wheels may be substituted.

A² is the receptacle for the cotton located in rear of the picking and conveying devices.

P′ is the driver's seat.

In order to save the fallen or ground cotton, I employ the auxiliary picker, (shown more particularly in Fig. 1ª,) which consists in two or more frames P, pivotally suspended from shaft S at the rear end of the body A, and of sufficient length to permit their lower ends to rest or drag upon the ground. Secured to shaft S, within the upper end of each frame, is a pulley or drum $t$, and a similar pulley or drum is journaled in the lower end of each frame. Over these drums pass endless belts Q, each of which is provided on its exterior face with a series of short hooks or claws $q$, the sides of the frames P being made to project sufficiently beyond the belt to enable these hooks or claws to just clear the ground. These endless belts Q are actuated by means of a band from the drive-wheel, which passes over a pulley on the end of shaft S.

R is a shaft mounted in bearings $s$ on the top of body A, a short distance in rear of the upper ends of the frames P. This shaft is provided with brushes $r$, and has at one end a pulley T, by which it is actuated by means of a band from any other shaft of the machine, so as to free the hooks or claws $q$ from cotton and deliver the same onto the receptacle U, of which the rear wall W of the body of the harvester forms a part.

Having thus described the various parts of my machine, I will proceed to describe its operation.

When it is desired to harvest cotton with my machine, it is driven to the field and placed in such a position that the curved picking-fingers are brought in line with the first row, the team occupying a position at the side of the row, and the forward end of the picker-frame is adjusted to the proper height by the driver by means of the foot-lever I⁴, connecting with the extensions I of the frame, as described. The team is then started forward, and the rows of picker-fingers secured to the bars F on the endless chains are carried forward underneath and to the front end of the frame, where they are brought in contact with the cotton-stalk. They then move up through the branches, stripping off the cotton, thence back over the front drum, the apron C receiving the cotton and conveying it back over the rear drum on shaft H, where it is discharged upon the apron K and conveyed to the receptacle A². The beater-arms $m$ on the reel-shaft M serve to clear the brushes $e$ of all cotton adhering to them as each series of fingers passes around the rear drum. The hooks or claws $q$ on the face of the auxiliary picker-belts Q move forward over the ground in the direction of the machine and grasp and carry upward all fibrous material, while material that is not fibrous fails to adhere and drops off. At the top the cotton that is carried up by the hooks or claws is swept off into receptacle U by the brushes $r$ on revolving brush-shaft R, and thus all the fibrous cotton, both on the plants and that has fallen to the ground along the rows over which the machine passes, is gleaned by a single operation and deposited within its proper receptacle upon the machine.

Having thus described my invention, what I claim as new, and desire to secure by Letters Patent, is—

1. In a cotton-harvester, the combination, with a cotton-receptacle, of a picker at the front end, consisting of two endless chains connected by a series of finger-supports, each support having a series of curved pointed fingers provided with brushes projecting laterally into the space between the fingers, said chains being supported upon a forwardly-projecting frame and actuated from the main wheels of the machine, substantially as described.

2. In a cotton-harvester, the combination, with a cotton-receptacle, of a picker at the front end, consisting of two endless chains connected by a series of finger-supports, each support having a series of curved pointed fingers provided with brushes projecting laterally into the space between the fingers, an endless apron closing the space between the chains, said chains and apron being supported upon a forwardly-projecting frame and actuated from the main wheels of the machine, substantially as described.

3. In a cotton-harvester, the combination, with a cotton-receptacle, of a picker at the front end, consisting of two endless sprocket-chains connected by a series of finger-supports, each support having a series of curved pointed fingers provided with brushes projecting laterally into the space between the fingers, an endless apron closing the space between the chains, a projecting frame pivoted at its rear end and provided at its front and rear ends with shafts, having each two sprocket-wheels for the chains, and a drum for the apron intermediate of said sprocket-wheels, substantially as described.

4. In a cotton-harvester, the combination, with a picker consisting of endless chains provided with a series of transverse finger-bars having a series of curved fingers, provided on the sides with brushes of yielding material projecting into the spaces between the fingers, of a frame pivoted at its rear end to a shaft journaled in the sides of the main body of the machine, said frame having drums for the apron and wheels at its ends for the chains, an auxiliary endless apron extending from beneath the discharging end of the picker-frame to a receptacle for the cotton, and suitable intermediate bands or gearing connecting the operating-shafts with the drive-wheels.

5. The combination, with the picking device described, consisting of a series of transverse finger-bars secured to endless chains supported upon a frame projecting from the body of the harvester, each of said bars being provided with a series of curved fingers having in their sides rows of brushes extending toward each other, of an auxiliary endless apron extending from beneath the discharging end of the picking device to a receptacle for the cotton, and a shaft in the rear of the picking device, and above the forward end of the auxiliary endless apron, said shaft being provided with a series of arms which pass through the brushes between the fingers of the picking mechanism, as and for the purpose described.

6. In a cotton-harvester, the combination, with a main frame and a projecting frame at or near the front of the main frame, carrying a picking device for gathering cotton from the stalks, of the auxiliary frames having their upper ends loosely pivoted upon a shaft at the rear end of the machine and the lower ends dragging on the ground, and having endless belts revolving over drums at the ends of the said frames, provided with hooks or claws which pass near the ground and gather all fallen cotton therefrom, whereby cotton is gathered both from the stalks and the ground at the same time, substantially as described.

7. In a cotton-harvester, the combination, with one or more frames having their upper ends loosely pivoted upon a shaft journaled in the sides of the body near its rear end and their free ends extending rearward and trailing upon the ground, each frame provided at both ends with pulleys or drums carrying an endless belt having on its face claws or hooks which pass over the ground beneath the lower drum and gather therefrom all fallen cotton, of the revolving shaft adjacent to the upper ends of said frames having brushes for disengaging the cotton, and the receptacle beneath said shaft, substantially as and for the purpose described.

8. A cotton-harvester having a picker at the front for gathering cotton from the stalks and a picker at the rear of the harvester for gathering cotton from the ground, substantially as and for the purpose described.

In testimony whereof I affix my signature in presence of two witnesses.

JAMES FRANKLIN CUNNINGHAM, Sr.

Witnesses:
W. H. SMITH,
JNO. F. FERGUSON.